United States Patent [19]

Feigel et al.

[11] Patent Number: 4,841,186

[45] Date of Patent: Jun. 20, 1989

[54] ELECTRONICALLY COMMUTATED, COLLECTORLESS DIRECTED-CURRENT MOTOR

[75] Inventors: Josef Feigel, Landshut; Klaus Pfendler, Bonndorf, both of Fed. Rep. of Germany

[73] Assignee: Standard Elektrik Lorenz Aktiengesellschaft, Stuttgart, Fed. Rep. of Germany

[21] Appl. No.: 175,498

[22] Filed: Mar. 30, 1988

[30] Foreign Application Priority Data

Mar. 31, 1987 [DE] Fed. Rep. of Germany ....... 3710658

[51] Int. Cl.$^4$ ............................................. H02K 21/12
[52] U.S. Cl. ...................................... 310/156; 310/216
[58] Field of Search ................. 310/46, 156, 216, 261, 310/DIG. 3

[56] References Cited

U.S. PATENT DOCUMENTS

| | | |
|---|---|---|
| 3,253,169 | 5/1966 | Haydon et al. ...................... 310/156 |
| 4,187,441 | 2/1980 | Oney ...................................... 310/112 |
| 4,359,657 | 11/1982 | Matsumoto et al. ................. 310/156 |
| 4,496,887 | 1/1985 | Ichihara et al. ................. 310/156 X |
| 4,499,407 | 2/1985 | MacLead .......................... 310/156 X |
| 4,618,792 | 10/1986 | Yates .................................... 310/156 |
| 4,639,627 | 1/1987 | Takekoshi et al. ................. 310/156 |
| 4,742,258 | 5/1988 | Earle et al. .......................... 310/156 |

FOREIGN PATENT DOCUMENTS

| | | |
|---|---|---|
| 0180120 | 5/1986 | European Pat. Off. . |
| 1218503 | 6/1966 | Fed. Rep. of Germany . |
| 2756626 | 6/1979 | Fed. Rep. of Germany . |
| 8612858 | 11/1987 | Fed. Rep. of Germany . |
| 2439501 | 5/1980 | France . |

OTHER PUBLICATIONS

Siemens Zeitschrift; Sep. 1966, Heft 9, "Elektronikmotor DM c 3, ...".

Primary Examiner—William M. Shoop, Jr.
Assistant Examiner—Marc S. Hoff
Attorney, Agent, or Firm—Spencer & Frank

[57] ABSTRACT

An electronically commutated, collectorless direct-current motor is disclosed whose stator has a drum winding and an external magnetic yoke surrounding same, and whose rotor consists of a shaft, a multipolar, permanent-magnet body, and an internal magnetic yoke. To reduce the moment of inertia, the internal magnetic yoke has kidney-shaped apertures. The direct-current motor exhibits a good dynamic behavior and is used in data processing equipment.

3 Claims, 2 Drawing Sheets

ELECTRONICALLY COMMUTATED, COLLECTORLESS DIRECTED-CURRENT MOTOR

BACKGROUND OF THE INVENTION

1. Field of the Invention

The present invention pertains to an electronically commutated, collectorless direct-current motor.

2. Discussion of the Art

A direct-current motor of the type described herein is known. A discussion of such a motor may be found in an article entitled "Elektronikmotor DMc3, ein neuer kollektorloser Gleichstrom-Kleinstmotor" in the German publication Siemens-Zeitschrift, September 1966, pp. 690–693. This prior-art direct-current motor is used, for example, to drive battery-powered tape recorders. In these drive motors, speed stability during operation is particularly important.

SUMMARY OF THE INVENTION

Electronically commutated direct-current motors are presently being used to a large extent in data processing equipment. For this application, electronically commutated direct-current motors are needed which exhibit a good dynamic behavior, i.e., low moment of inertia of the rotor and, thus, short starting and braking times, at as high an operating torque as possible.

The prior-art direct-current motor does not have this property; due to its solid rotor, it has a relatively poor dynamic operational behavior.

It is therefore the object of the present invention to provide an electronically commutated, collectorless direct-current motor which develops a high torque and at the same time has a good dynamic behavior.

Further advantageous aspects of the invention are set forth in the claims and in the description.

BRIEF DESCRIPTION OF THE DRAWINGS

An embodiment of the invention will now be described with reference to the accompanying drawings, in which.

DESCRIPTION OF THE PREFERRED EMBODIMENT

Figure 1:
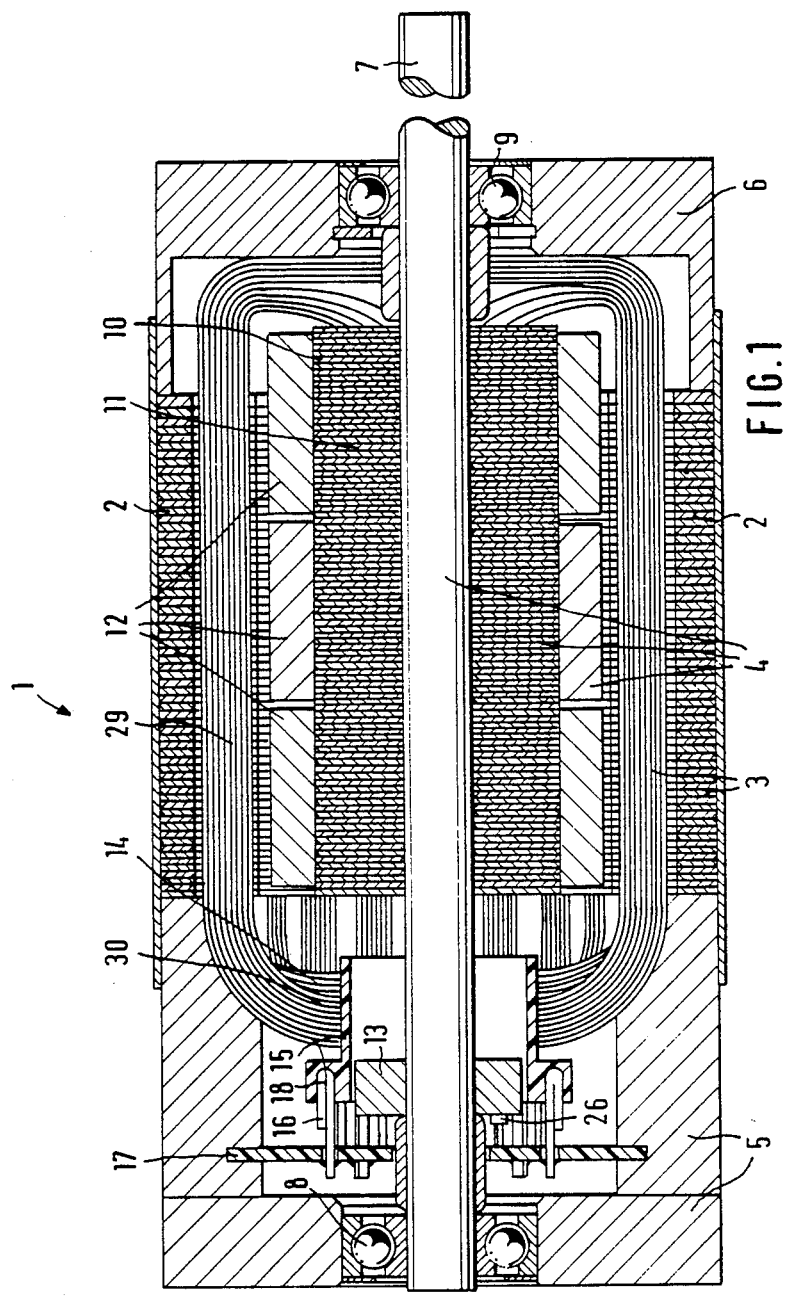
FIG. 1 is a longitudinal section of an embodiment of the electronically commutated, collectorless direct-current motor according to the invention.

The electronically commutated, collectorless direct-current motor 1 in accordance with the invention is shown in FIG. 1. It comprises a stator 3 with an external magnetic yoke 2, a rotor 4 with an internal magnetic yoke 11, and two end shields 5, 6. The stator 3 comprises a stator coil 14 which is designed as a drum winding and has a permanently fixed, cylindrical plastic ring 15 in a winding head 30. The stator coil 14 is self-supporting. The ends 18 of the stator coil are welded to circularly arranged, U-shaped eyehooks 16 which are secured in the cylindrical plastic ring 15 and soldered to a circuit board 17. Two Hall-effect sensors 26 are fitted in a recess of the cylindrical plastic ring 15 and soldered to the circuit board 17. The circuit board 17 is in locking engagement with the end shield 5.

The stator coil 14 and the external magnetic yoke 2 are so constructed that the stator 3 can be inserted into the magnetic yoke 2 in the axial direction. To this end, a dynamo-sheet lamination used as the external magnetic yoke 2 has a circular cutout and axial grooves in which the phase windings 29 of the stator coil 14 are contained. Through this arrangement, good magnetic coupling is achieved.

The rotor 4 consists of a shaft 7, which is connected with the end shields 5, 6 via two bearings 8, 9, the internal magnetic yoke 11 supporting a multipolar body 12 of permanent-magnet material, and an annular sensor magnet 13 for position determination. The sensor magnet 13 is located inside the cylindrical plastic body 15 in the area of the Hall-effect sensors 26.

The internal magnetic yoke 11 is a steel cylinder or a cylinder built up of laminated dynamo sheets. It has a central circular aperture 40 which is provided with axial grooves 35 and in which the shaft 7 is fitted. To reduce the moment of inertia D, the internal magnetic yoke 11 has additional, kidney-shaped apertures 41. The multipolar body 12 of permanent-magnet material is supported by the magnetic yoke 11 and magnetized in the radial direction. The body 12 of permanent-magnet material consists of magnetic pieces 42 which are parts of diametrically divided annular magnets or parts of axially embedded magnetic bars.

The shape of the apertures 41 results from the optimization of the function of the magnetic yoke, namely to achieve magnetic coupling, which would best be implemented with a solid magnetic yoke, and of dynamic behavior of the direct-current motor, which is achieved in the direct-current motor in accordance with the invention by reducing the moment of inertia D to a minimum. The moment of inertia D is given by:

$$D = \Sigma \Delta m_i r_i^2,$$

where $r_i$ is the distance of a mass element $\Delta m_i$ from the axis of rotation. It is apparent that the mass elements $\Delta m_i$ located at a great distance $r_i$ from the axis of rotation substantially determine the moment of inertia D and that the shape of the apertures 41 in the area of the great distance $r_i$ is of particular importance.

It is the mass elements $\Delta m_i$ with a greater $r_i$, however, which have an essential influence on the magnetic return path for the multipolar body 12 of permanent-magnet material. To optimize the design of the direct-current motor in accordance with the present invention, it must be taken into account that the magnetic pieces 42 require different flux densities in the diametrical direction. Thus, the magnetic flux in the diametrical direction is strongest in an area 43 between two magnetic pieces, so that a larger magnetically conductive mass is required in this area 43.

Therefore, the internal magnetic yoke 11, seen in a cross section, has an inner ring 44 and an outer ring 45 which are interconnected by bridge portions 46. The bridge portions 46 are located at the areas 43 between the magnetic pieces 42. The outer ring 45 has its smallest thickness in the middle between the bridge portions 46; the thickness increases towards the bridge portions 46. The transition from the outer ring 45 to the bridge portions 46 is gradual. As a result, the free spaces between the two rings 44, 45 and between neighboring bridge portions 46 have a kidney-shaped cross section.

Instead of the kidney-shaped apertures 41, there can simply be holes (not shown), which, although they certainly represent a deviation from the optimum geometry, result in a low-cost design if a steel cylinder is used as the internal magnetic yoke 11.

Figure 2:
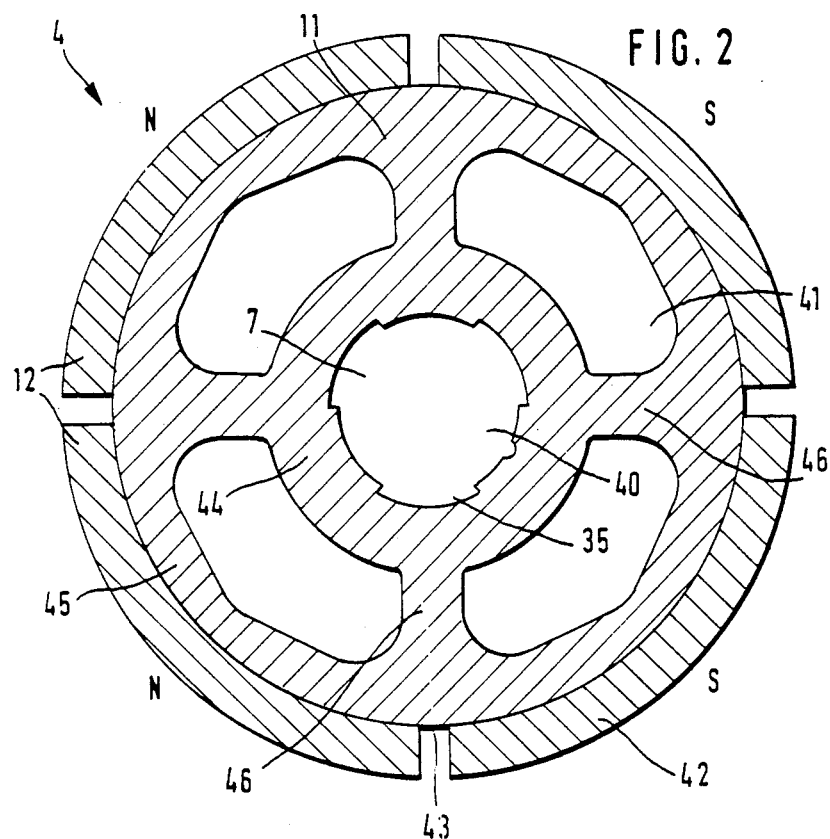
FIG. 2 is a section of the rotor of FIG. 1.
Figure 3:
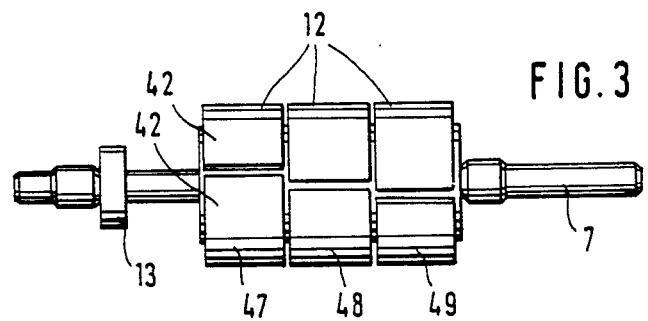
FIG. 3 is a side view of the rotor of FIG. 1.

To reduce the detent torque, which occurs particularly if the number of poles is small, the multipolar body 12 of permanent-magnet material is divided into three segments 47, 48, 49, which are diametrically displaced in relation to each other by an angle $\alpha$ (FIG. 3). In this case, the bridge portions 46 are arranged in the area 43 between the magnetic pieces 42 of the central segment 48, as shown in FIG. 2. Thus, the bridge portions and the areas between the magnetic pieces of the outer segments 47 and 49 are displaced in relation to each other by $+\alpha$ and $-\alpha$. To reduce the detent torque, the individual sheets, if the internal magnetic yoke is built up of laminations, can be arranged helically, with the body of permanent-magnet material having only one segment. These solutions entail a weaker magnetic return flux but reduce the detent torque.

It is also conceivable to axially divide the internal magnetic yoke 11 into three parts and arrange each of them in optimum fashion relative to the corresponding permanent-magnet segments.

We claim:

1. A motor comprising a stator with a drum winding and an external magnetic yoke surrounding the same, said rotor having a shaft, a multipolar permanent-magnetic body, and an internal magnetic yoke having a plurality of kidney-shaped apertures for reducing the moment of inertia.

2. Electronically commutated, collectorless direct-current motor comprising a rotor having a multipolar body of permanent-magnet material, a shaft, an internal magnetic yoke, and a multipolar stator coil surrounding the rotor and being surrounded by a magnetic yoke, the internal magnetic yoke having axial apertures and being disposed between the shaft and the body of permanent-magnet material, said internal magnetic yoke having an inner and an outer ring, said body of permanent-magnet material having diametrically arranged magnetic pieces, said two rings being interconnected by several bridge portions whose number is equal to the number of magnetic pieces, the outer ring varying in thickness at different points, the thickness being the smallest at the center between two bridge portions and the largest at said bridge portions.

3. Electronically commutated, collectorless direct-current motor comprising a rotor having a multipolar body of permanent-magnet material, a shaft, an internal magnetic yoke, and a multipolar stator coil surrounding the rotor and being surrounded by a magnetic yoke, the internal magnetic yoke having axial apertures and being disposed between the shaft and the body of permanent-magnet material, said internal magnetic yoke being a cylinder built up of dynamo sheets and said multipolar permanent magnetic body comprising a plurality of helically positioned segments for reducing the torque on said motor.

* * * * *